Patented June 18, 1940

2,205,108

UNITED STATES PATENT OFFICE 2,205,108

PLASTIC COMPOSITIONS

Raphael Rosen, Elizabeth, N. J., assignor to Standard Oil Development Company, a corporation of Delaware No Drawing. Application September 10, 1937, Serial No. 163,247

10 Claims. (Cl. 260—42)

This invention relates to a new composition of matter and methods of producing same. More particularly, it relates to compositions comprising two different types of plastic substances which, for the sake of brevity, will be referred to as a cyclic plastic and an aliphatic plastic.

The essential object of the invention is to make improved homogeneous compositions of these two types of materials having properties superior to either of the separate ingredients. Other objects and advantages of the invention will be apparent to those skilled in the art from the following specification.

The cyclic plastic used according to the present invention is preferably prepared by methods known to the art such as have been described in U. S. Patents 1,993,025-38 inclusive, 2,067,054, 2,067,859, 2,072,820, etc. which disclose the reaction of maleic anhydride with a terpene hydrocarbon, such as alpha-terpinene, alpha- or beta-pinene, etc. or alcohol—or acid—derivatives thereof, preferably using heat to accelerate the reaction and this may be done by refluxing the terpene with the maleic anhydride. Catalysts such as sulfuric acid, zinc chloride, p-toluene sulfonic acid and the like may be used. The temperature should be about 150-200° C. and generally 2-5 hours will suffice. It is desirable to use an excess of the terpene, which can be recovered unchanged by distillation upon completion of the reaction.

Instead of pinene, a number of other terpenes or terpene-like compounds can be used such as terpinolene, dipentene, d- and l-limonene, alpha-phellandrene, alpha-terpinene or mixed liquids, e. g. narrow-cut turpentine distillates, rich in one or more of these compounds. For the sake of explanation, the graphic formulas of a number of these terpene hydrocarbons are given:

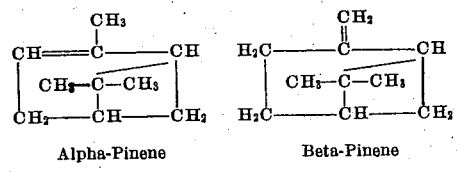

Alpha-Pinene        Beta-Pinene

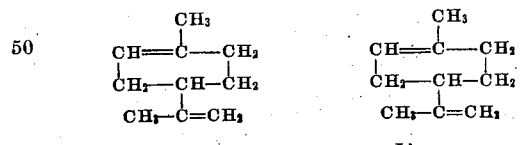

Di-Pentene        Limonene

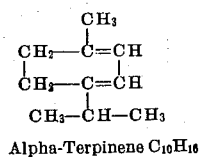   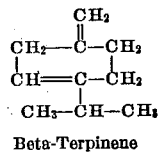

Alpha-Terpinene C₁₀H₁₆    Beta-Terpinene

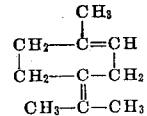   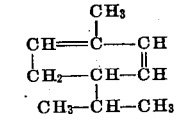

Terpinolene       Alpha-Phellandrene

The resulting condensation product, which is a polybasic acid may be used as such but is preferably esterified either partly or completely by reaction with various monohydric alcohols, e. g. methyl, ethyl and isopropyl alcohol, to make esters, or with polyhydric alcohols such as ethylene glycol, propylene glycol, glycerol, pentaerythrite, etc., to form alkyd resins which are generally amorphous thermoplastic solids with a softening point between about 50 and 100° C., or with various substituted aliphatic alcohols such as benzyl alcohol, ethylene chlorohydrin, glycerol monochlorohydrin, glyceryl monoethyl ether, etc. If desired, the polybasic acids may be reacted with the alcohols in the presence of modifying agents such as linseed oil or other fatty oils, preferably of the drying oil type or fatty acids, e. g. stearic or oleic acid, or resins, e. g. rosin, ester gum, etc., or, if desired, the polybasic acids may be reacted with other organic acids such as abietic acid or abietic acid esters.

Another method of preparing cyclic maleic anhydride condensation product plastics is to react maleic anhydride with conjugated diolefines such as butadiene, 1,3-hexadiene, etc. and, if desired, reacting the resulting polybasic acid with a mono- or poly-hydroxy alcohol.

Instead of using maleic anhydride, it is possible to use other maleic compounds such as maleic acid and maleic esters, e. g. methyl, ethyl, propyl, etc. maleic acid esters, or it is possible to use still other unsaturated compounds selected from the group consisting of olefines and acetylenes, containing at least one carbonyl group adjacent to the unsaturated linkage, for example, acetylene dicarboxylic acid (COOHC:CCOOH), quinone (C₆H₄O₂), alpha-naphthaquinone (C₁₀H₆O₂), acrolein (CH₂CHCHO).

These various cyclic plastics have the disadvantage that they are quite brittle and lose their adhesiveness when hard, especially at temperatures much below their softening point.

In carrying out the invention, it is preferred to use esters or acids or alkyd resin derivatives thereof which are soluble in petroleum oils, such as petroleum ether, as by using such soluble compounds a mutual solution of the several constituents takes place with the resultant formation of a homogeneous product which will remain homogeneous under changing conditions of temperature, etc. However, where such changing conditions are not an important factor, it may be possible to use the insoluble varieties of cyclic plastics if they are once thoroughly and intimately mixed together into a homogeneous composition by suitable mechanical equipment such as rolling in a rubber mill or kneading in a suitable kneading machine or by combination of rolling and kneading.

The aliphatic plastic which is to be mixed with the above described aromatic plastic in accordance with the present invention may be made by methods which are likewise known to the art, for instance, as described in U. S. Patents 2,049,062, 2,061,570 and 2,084,501. A suitable process consists in polymerizing iso-olefines such as isobutylene or 2-methyl butene-1, which is an iso-amylene, at temperatures substantially below $-10°$ C. and preferably of the order of $-40°$ to $-100°$ C. in the presence of boron fluoride and preferably also in the presence of a suitable diluent such as liquefied butane, propane, ethane, ethylene, or mixed liquefied gaseous hydrocarbons. Instead of boron fluoride, other volatilizable inorganic halide catalysts may be used such as aluminum chloride, titanium tetrachloride or stannic chloride.

When the polymerization is carried out in the upper portion of the temperature range mentioned, namely, around $-40°$ C. to $-10°$ C., the polymer is found to have an average molecular weight of about 1,000–5,000, whereas when the reaction is carried out at much lower temperatures, the molecular weight is correspondingly higher, for instance, 15,000, 50,000, 80,000, 100,000, 200,000 or even 500,000, although in order to obtain these extremely high molecular weights very pure starting materials must be used, i. e. iso-olefine, catalyst and diluent, taking particular care not to have any impurities present which are particularly active poisons for this particular type of polymerization. For instance, the starting material should be particularly free from various types of sulfur compounds. Also, although the polymerization can be carried out to some extent in the presence of other low molecular weight olefines, such as normal butylene or di-isobutylene, in which case a certain amount of copolymerization occurs as between normal butylene and isobutylene, it is preferred to start with substantially pure monomeric iso-olefines of the type described.

The resultant polymers are substantially colorless plastic solids which are substantially saturated in respect to hydrogen, having an iodine number below about 5 and generally even below 1, and they are highly resistant to oxidation and attack by various chemical reagents such as alkalies and acids. These polymers also have the particular property of greatly increasing the viscosity of liquids in which they are dissolved and simultaneously increasing the viscosity index of said liquids, which is another way of saying that they flatten the temperature-viscosity curves of the liquids in which they are dissolved. For a description of the meaning of the term viscosity index and a recommended procedure for determining same, see the article by E. W. Dean and G. H. B. Davis entitled "Viscosity Variations of Oils with Temperature" in Chem. and Met., vol. 36, page 618–9 (Oct. 1929). Chemically, these iso-olefine polymers are linear type polymers which may be represented by extremely long chains of carbon atoms having methyl groups attached as side groups periodically, all of the carbons being linked with single bonds except for a residual double bond present in the last molecule of iso-olefine which has been combined in the polymerization process. Generally, the polymers having a molecular weight between the approximate limits of 1,000 and 30,000 or 40,000 are plastic solids which have a definite tendency toward cold-flowing, whereas the polymers in the much higher range of molecular weight, particularly those above 100,000, are plastic solids which are more elastic, rubbery in nature, and somewhat less adhesive on the surface than the lower polymers.

Although such polymers are preferred as the aliphatic plastic it is possible to use other types of plastic, elastic, high molecular weight saturated aliphatic hydrocarbon substances such as may be obtained by the hydrogenation of unsaturated aliphatic hydrocarbon substances such as rubber, polymerized butadiene, etc., for instance, hydro-rubber having a molecular weight of about 10,000.

According to the present invention, the first described cyclic plastic is combined with the above described aliphatic plastic, to make a homogeneous product superior in certain respects to either constituent. The proportions of these two constituents may be varied over a fairly broad range, such as about 5–75% of the aromatic plastic, although it is preferred to use about 10 to 50% of the aromatic plastic, the balance being the aliphatic polymer. The exact percentage of the two constituents to be used, as well as of any other modifying agent, such as those mentioned herebelow, will depend on a number of different factors, chief of which are the hardness and brittleness of the cyclic plastic and the molecular weight of the aliphatic plastic. For instance, with a cyclic plastic which is extremely hard and brittle, a moderately large amount (30 to 50%) of aliphatic plastic having an average molecular weight in the range of 5,000 to 15,000 should be used, or an even larger amount (e. g. 40 to 70%) of an aliphatic plastic having an average molecular weight in the range of about 80,000 to 200,000, in either case the balance being essentially a cyclic plastic.

The mixing is best accomplished in a kneading machine such as a Banbury mixer or on a pair of rolls such as are used in masticating rubber. For example, polymerized isobutylene having an average molecular weight of about 80,000 is milled on a rubber mill at a temperature between the approximate limits of 20 and 125° C., preferably about 100° C., and the powdered cyclic plastic resin is sprinkled on during the milling. The time of mixing may be about 10 minutes for small experimental batches, e. g. 100 grams or so, and may be about ½ hour, 1 hour, or even longer, if desired, with large batches. If desired, the mixing may also be accomplished by dissolving both materials separately in suitable solvents such as naphtha, carbon tetrachloride, etc. and mixing the two solutions and then evaporating the solvent or solvents. In addition to these two fundamental ingredients, other addition agents of lesser importance may be added in order to modify the physical texture and consistency of the composition, for instance, sulfur may be added to prevent degradation of the aliphatic plastic; inorganic or organic fillers such as diatomaceous earth, clay, pulverized limestone or chalk, zinc oxide, iron oxide, carbon black, or other plastic materials such as rubber, hydro-rubber or chlorinated derivatives thereof, or various resins such as rosin, ester gum, varnish resins, or various waxes such as paraffin wax, montan wax, etc. The fillers may be used in amounts ranging from about 1 to 20%, preferably about 5–10%, whereas the plastic resinous or waxy modifying agents may be used in somewhat larger amounts such as from 5 to 30 or 40%, preferably about 10 to 20%. Small amounts, e. g. 1% to 5 or 10%, of plasticizers, such as viscous mineral oils, tricresyl phosphate, etc., may be used.

The following examples are given for the sake of illustration without intending to limit the invention thereto:

Example 1

10 parts of cyclic plastic, prepared by reacting pinene with maleic anhydride and subsequently esterifying the resulting product with glycerol, are mixed with 90 parts of polymerized isobutylene having a molecular weight of about 100,000. The mixed homogeneous composition is found to be substantially more elastic and tough (i. e. less brittle) than the cyclic plastic and almost as elastic as the isobutylene polymer and furthermore the composition is found to possess great resistance to oxidation and attack by acids and alkalies and is not subject to hardening by exposure to the atmosphere.

Example 2

50 parts by weight of a similar cyclic plastic as described in Example 1 are mixed with 50 parts by weight of isobutylene polymer as that described in Example 1. The resulting homogeneous composition is found to be satisfactorily plastic and yet at ordinary atmospheric temperature it has a substantially firm texture. The composition also has good adhesive properties and is useful for preparing coatings, for waterproofing fabrics such as cloth, paper, etc. and may be used as an insulating material for electric conductors such as wires, cables, etc., and is also a satisfactory bodying material for use in lacquers, paints, etc. It is also found useful as a thickening agent for lubricating oils such as mineral oils, castor oils, and greases made from mineral and fatty oils. This composition is also satisfactory for making various types of molded plastics.

Example 3

50 parts of isobutylene polymer of about 80,000 molecular wt. are milled with 50 parts of powdered terpene plastic (unmodified alkyd type having a softening point of 95–100) for 15 minutes at 100° C. The warm homogeneous mass is pressed or rolled into sheets and calendered on cloth. The cloth coating is dry and flexible whereas cloth coated with the isobutylene polymer alone is slightly tacky and tends to pick up and hold dust. The terpene plastic itself is too brittle for use in coating flexible fabrics. The combination gives a non-tacky flexible cloth suitable for crease-proof cloth and the like.

Example 4

Some more of the same composition prepared in Example 3, i. e. a mixture of 50 parts of isobutylene polymer with 50 parts of terpene plastic, was worked up and found very suitable for a number of other particular uses, for example, for lining tanks or vessels in which normally corrosive liquids are stored or reacted with other materials, also for impregnating cloth, paper, wood, or other fibrous or porous materials, to improve their durability and impenetrability as to water, air, etc.

Example 5

A cyclic plastic was prepared by reacting butadiene with an ethyl ester of maleic anhydride according to the equation

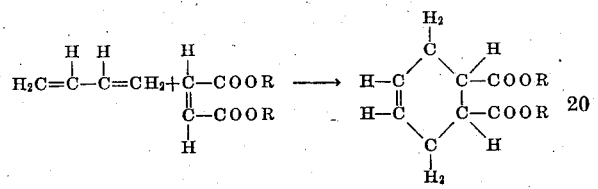

where R is an ethyl group $C_2H_5$.

A sample of the product was dissolved in chloroform solution, $CHCl_3$, containing an equal weight of polymerized isobutylene having a molecular weight of about 100,000. This solution was evaporated to dryness under vacuum and the homogeneous product was pressed to a sheet at 110° C. The sheet was transparent and non-brittle but when stretched showed a slight cloudiness similar to that which is observed when compositions of isobutylene polymer and terpene-maleic anhydride plastics are stretched.

The invention is not to be limited to the specific embodiments shown or the specific examples given, nor to any theories advanced as to the operation of the invention, but in the appended claims it is intended to claim all inherent novelty in the invention as broadly as the prior art permits.

I claim:

1. A tough non-brittle homogeneous composition comprising in combination an aliphatic plastic consisting of a plastic, elastic, isobutylene polymer hydrocarbon having a molecular weight above about 1,000, with a cyclic polymer obtained by condensation of unsaturated compounds selected from the group consisting of olefines and acetylenes, containing at least one carbonyl group adjacent to the unsaturated linkage, with unsaturated hydrocarbon compounds capable of reacting therewith to produce normally brittle resinous plastics the said homogeneous composition being characterized by the combination of properties of toughness, elasticity and resistance to acids, alkalies and oxidation.

2. Composition according to claim 1 in which the aliphatic plastic is an isobutylene polymer present in the proportion of 5% to 75% of the total mixture.

3. Composition according to claim 1 in which the cyclic plastic comprises essentially the condensation product of maleic anhydride with a terpene hydrocarbon.

4. Composition according to claim 1 in which the cyclic plastic is one prepared by condensing a terpene hydrocarbon with maleic anhydride and esterifying the resulting acidic resin with an aliphatic alcohol.

5. Composition according to claim 1 in which the cyclic plastic is one which is soluble in petroleum ether.

6. A homogeneous composition comprising in combination a major proportion of a plastic substantially saturated isobutylene polymer having a molecular weight above about 2,000 and a minor proportion of a plastic cyclic polymer derived by condensing a terpene hydrocarbon with maleic anhydride and esterifying the resultant acidic resin with an alcohol selected from the group consisting of glycol and glycerol the said homogeneous composition being characterized by toughness, elasticity, and a high resistance to oxidation.

7. Composition according to claim 6 containing about 10 to 50 parts by weight of the cyclic plastic and 90 to 50 parts by weight of isobutylene polymer.

8. A method of preparing improved plastic homogeneous compositions which comprises compounding together an aliphatic plastic consisting of a plastic polymer non-hardening iso-butylene polymer having a molecular weight above about 2,000 with a cyclic plastic comprising a condensation product of a terpene hydrocarbon with maleic anhydride.

9. A homogeneous composition of matter comprising in combination a substantially saturated isobutylene hydrocarbon polymer having a molecular weight above about 1,000 and an unsaturated cyclic polymer comprising a condensation of unsaturated compounds, selected from the group consisting of olefins and acetylenes containing at least one carbonyl group adjacent to the unsaturated linkage with a reactive cyclic compound the said composition being characterized by the properties of toughness, elasticity, and the resistance to oxidation.

10. A composition of matter comprising in combination polyisobutylene having a molecular weight above about 1,000, present in a proportion of 50 to 90 parts and a polymer of pinene and maleic anhydride esterified with glycerol in the proportion of 50 to 10 parts, the composition being characterized by homogeneity, toughness, moderate elasticity and substantial non-brittleness.

RAPHAEL ROSEN.